United States Patent [19]

Yamamoto

[11] Patent Number: 5,204,815
[45] Date of Patent: Apr. 20, 1993

[54] ELECTRIC CONTROL APPARATUS FOR CONTROL OF THE RUNNING CHARACTERISTIC OF A WHEELED VEHICLE

[75] Inventor: Masaki Yamamoto, Mishima, Japan

[73] Assignee: Toyota Jidosha Kabushiki Kaisha, Toyota, Japan

[21] Appl. No.: 657,763

[22] Filed: Feb. 20, 1991

[30] Foreign Application Priority Data

Feb. 20, 1990 [JP] Japan .................................. 2-39126

[51] Int. Cl.⁵ .............................................. B60T 8/32
[52] U.S. Cl. .......................... 364/424.05; 364/426.03; 280/707
[58] Field of Search ...................... 364/426.03, 424.05, 364/426.01; 180/197; 280/707

[56] References Cited

U.S. PATENT DOCUMENTS

| | | | |
|---|---|---|---|
| 4,760,893 | 8/1988 | Sigl et al. | 180/197 |
| 4,794,539 | 12/1988 | Wallentowitz | 364/426.01 |
| 4,823,269 | 4/1989 | Fujioka et al. | 364/426.03 |
| 4,828,283 | 5/1989 | Ishii | 280/91 |
| 4,867,466 | 9/1989 | Soltis | 280/94 |
| 5,016,179 | 5/1991 | Utzt | 364/426.02 |
| 5,024,285 | 6/1991 | Fujita | 180/197 |
| 5,033,573 | 7/1991 | Hrovat | 180/197 |
| 5,051,908 | 9/1991 | Shiraishi | 364/426.02 |

FOREIGN PATENT DOCUMENTS

| | | |
|---|---|---|
| 0296756 | 6/1988 | European Pat. Off. . |
| 0315352 | 10/1988 | European Pat. Off. . |
| 0316932 | 11/1988 | European Pat. Off. . |
| 0338588 | 10/1989 | European Pat. Off. . |
| 3545715 | 7/1987 | Fed. Rep. of Germany . |
| 3910002 | 10/1989 | Fed. Rep. of Germany . |

Primary Examiner—Thomas G. Black
Attorney, Agent, or Firm—Cushman, Darby & Cushman

[57] ABSTRACT

An apparatus for estimating a slip angle in a wheeled vehicle having a set of front road wheels and a set of rear road wheels, including the same kind of wheel speed sensors arranged to detect each rotation speed of the road wheels for producing wheel speed signals respectively indicative of the detected rotation speeds of the road wheels, and a microcomputer responsive to the wheel speed signals from the sensors for calculating a first difference in speed between the front and rear road wheels and a second difference in speed between the left and right road wheels and for calculating a ratio of the first difference in speed relative to the second difference in speed for estimating the calculated ratio as a slip angle of the vehicle.

4 Claims, 14 Drawing Sheets

ELECTRIC CONTROL APPARATUS FOR CONTROL OF THE RUNNING CHARACTERISTIC OF A WHEELED VEHICLE

BACKGROUND OF THE INVENTION

1. Field of the Invention

The present invention relates to an apparatus for estimating a slip angle of a wheeled vehicle for control of a suspension system and/or a rear-wheel steering mechanism in a four-wheel steering system.

2. Discussion of the Prior Art

In Japanese Patent Early Publication No. 60-191876, there has been proposed a rear-wheel steering mechanism the operation of which is controlled in accordance with a slip angle of the wheeled vehicle to enhance stability in the steering operation. In the rear-wheel steering mechanism, plural kinds of sensors are provided to detect each steering angle of the front and rear road wheels, a travel speed of the vehicle, a weight of the vehicle and a yaw-rate of the vehicle, and a computer is adapted to solve a condition equation on a basis of input data indicative of the steering angles, travel speed, weight and yaw-rate thereby to estimate a slip angle of the vehicle. The provision of such various kinds of sensors will lower productivity of the steering mechanism, and the time consumption for calculation of the equation will increase because of a large amount of data to be calculated.

SUMMARY OF THE INVENTION

A primary object of the present invention is to provide an electric control apparatus capable of estimating a slip angle of the vehicle only by the four rules of arithmetical operations on a basis of rotation speeds of front and rear road wheels detected by the same kind of wheel speed sensors for control of a suspension system and/or a rear-wheel steering mechanism in a four-wheel steering system.

A secondary object of the present invention is to provide an electric control apparatus for the vehicle suspension system capable of controlling a distribution ratio of roll stiffness at the front and rear road wheels in accordance with the estimated slip angle of the vehicle.

A further object of the present invention is to provide an electric control apparatus for the rear-wheel steering mechanism capable of further estimating a yaw-rate and a travel speed of the vehicle on a basis of rotation speeds detected by the wheel speed sensors for calculating an optimum rear-wheel steering angle in relation to the estimated slip angle and yaw-rate in accordance with the estimated travel speed.

According to the present invention, there is provided an apparatus for estimating a slip angle in a wheeled vehicle having a set of front road wheels and a set of rear road wheels, which apparatus comprises wheel speed detecting means for detecting each rotation speed of the road wheels for producing wheel speed signals respectively indicative of the detected rotation speeds of the road wheels, means responsive to the wheel speed signals for calculating a first difference in speed between the front and rear road wheels and a second difference in speed between the left and right road wheels and for calculating a ratio of the first difference in speed relative to the second difference in speed for estimating the calculated ratio as a slip angle of the vehicle.

For control of the vehicle suspension, the apparatus further comprises means for controlling a distribution ratio of roll stiffness at the front and rear road wheels in accordance with the estimated slip angle of the vehicle. In the case that the vehicle is equipped with a front-wheel steering mechanism cooperable with a rear-wheel steering mechanism, the apparatus for slip angle estimation further comprises means for calculating a yaw-rate of the vehicle based on the second difference in speed between the left and right road wheels, means responsive to the wheel speed signals for calculating an average value of the detected rotation speeds of the road wheels for estimating the calculated average value as a travel speed of the vehicle, and means for calculating an optimum rear-wheel steering angle in relation to the estimated slip angle and calculated yaw-rate in accordance with the estimated travel speed for control of the rear-wheel steering mechanism.

BRIEF DESCRIPTION OF THE DRAWINGS

Additional objects, features and advantages of the present invention will be more readily appreciated from the following detailed description of certain preferred embodiments thereof when taken together with the accompanying drawings, in which.

DESCRIPTION OF THE PREFERRED EMBODIMENTS

Figure 1A:
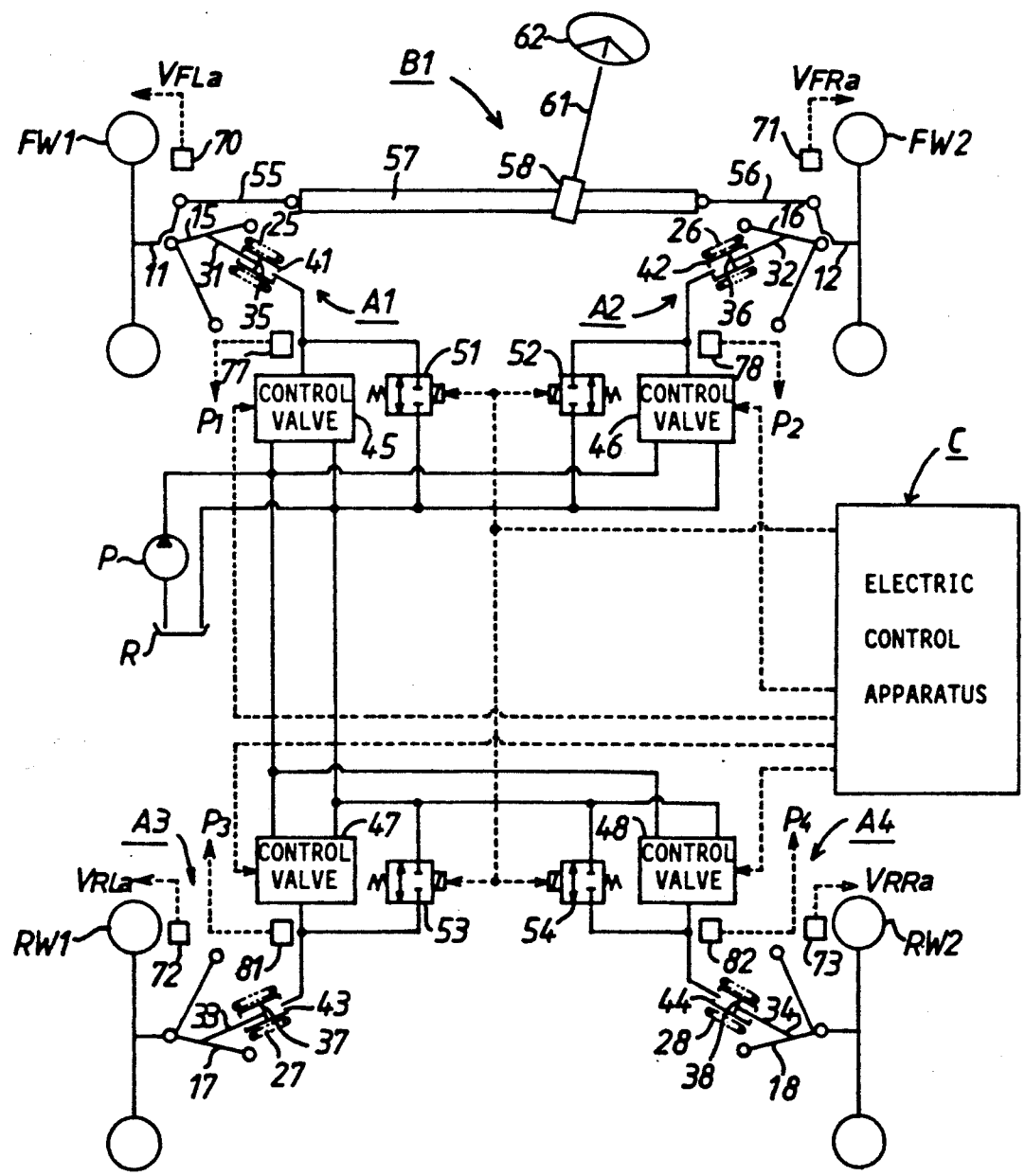
FIGS. 1(a) and 1(b) illustrate an electric control apparatus for suspension mechanisms in a wheeled vehicle.
Figure 2:
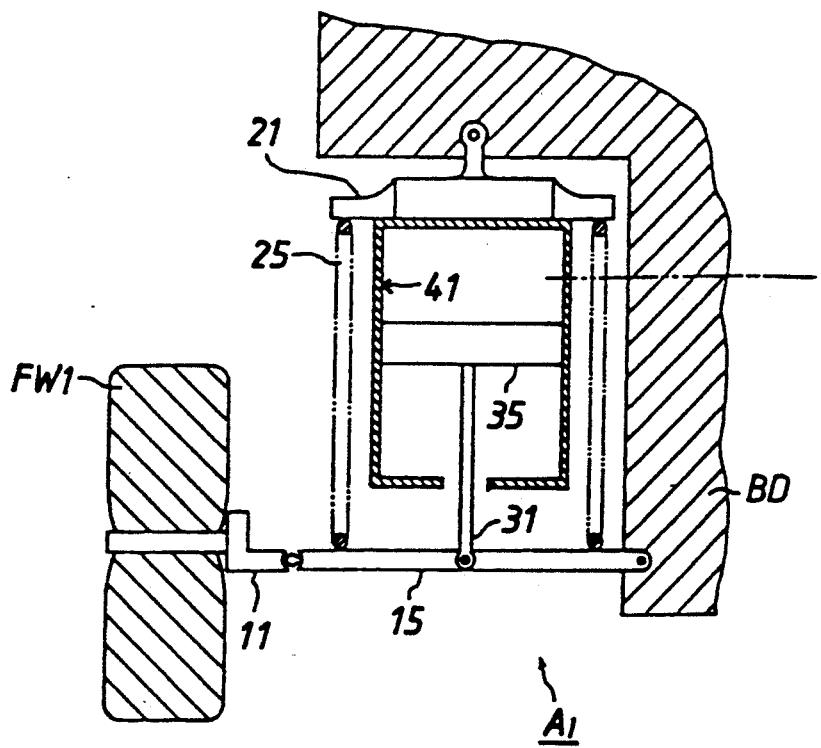
FIG. 2 is a sectional view of one of the suspension mechanisms shown in FIG. 1(a)

Referring now to the drawings, FIG. 1(a) schematically illustrates a wheeled vehicle the suspension mechanisms A1-A4 of which are arranged to support each axle support member of front and rear road wheels FW1, FW2, RW1, RW2 from a body structure BD of the vehicle in such a manner as shown in FIG. 2. The suspension mechanism A1 of front road wheel FW1 includes a suspension arm 15 rotatably connected at its one end to the vehicle body structure BD and at its other end to a knuckle arm 11 of front road wheel FW1, an upper support member 21 rotatably mounted to the vehicle body structure BD at a position located above the suspension arm 15, a suspension spring 25 disposed between the suspension arm 15 and support member 21, and a hydraulic cylinder 41 the housing of which is mounted to the vehicle body structure BD and containes therein a piston 35 connected to the suspension arm 15 through a piston rod 31. Thus, the vehicle body structure BD is supported on the suspension arm 15 by means of the pressure in hydraulic cylinder 41 and the resilient force of suspension spring 25. The suspension mechanisms A2-A4 of front road wheel FW2 and rear road wheels RW1, RW2 are constructed in the same manner as the suspension mechanism A1 by means of suspension arms 16-18, suspension springs 26-28 and hydraulic cylinders 42-44.

The fluid chambers of hydraulic cylinders 41-44 are respectively connected to electrically operated pressure control valves 45-48 which are connected at their input ports to a hydraulic pump P and at their exhaust ports to a fluid reservoir R to control the pressure in hydraulic cylinders 41-44 in accordance with an electric control signal applied thereto. Electromagnetic changeover valves 51-55 are respectively disposed within bypass circuits of the pressure control valves 45-48 to be opened in their energized conditions and to be closed in their deenergized conditions.

Figure 1B:
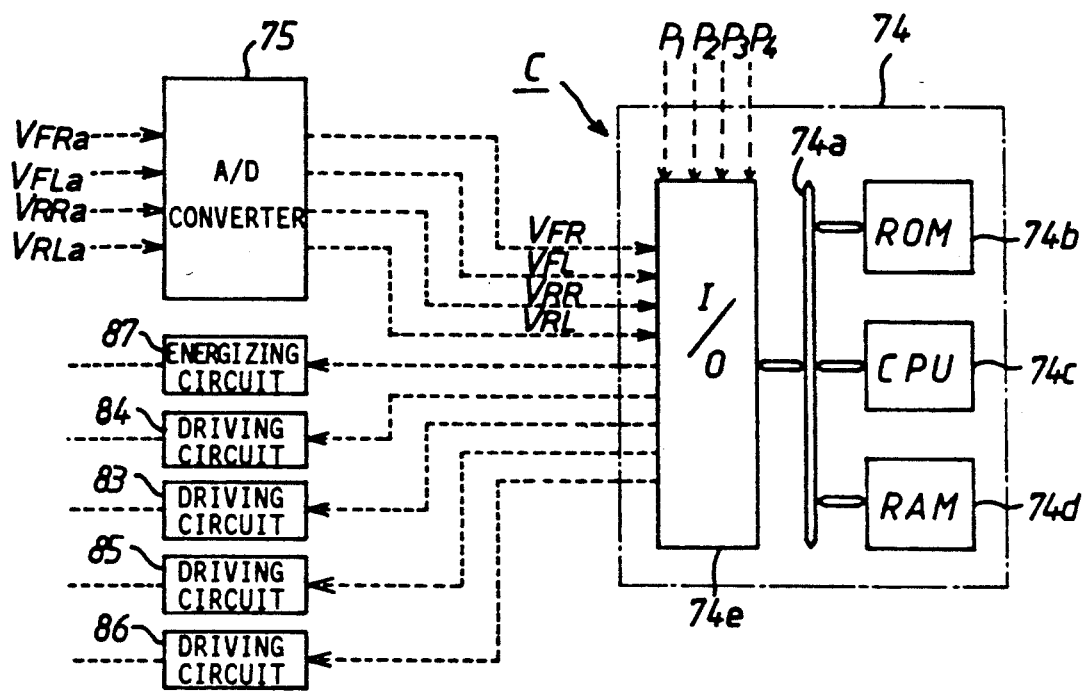

A front-wheel steering mechanism B1 of the vehicle includes a lateral rack bar 57 operatively connected at its opposite ends to the front road wheels FW1, FW2 through tie rods 55, 56 and knuckle arms 11, 12. The rack bar 57 is operatively connected to a steering wheel 62 through a pinion 58 and a steering shaft 61 to be axially displaced in response to rotation of the steering wheel 62. As shown in FIGS. 1(a) and 1(b), an electric control apparatus C for control of the suspension mechanisms A1-A4 has a microcomputer 74 which includes a read-only memory or ROM 74b, a central processing unit or CPU 74c, a random access memory or RAM 74d and an input-output device or I/O 74e connected to one another through a bus line 74a. The ROM 74b is arranged to memorize a control program shown by a flow chart in FIG. 3 and a table data shown in FIG. 4. The control program is adapted to control the suspension mechanisms A1-A4, and the table data is adapted to determine each distribution ratio of roll stiffness at the front and rear road wheels in relation to an estimated slip angle of the vehicle. The CPU 74c is arranged to execute the control program, and the RAM 74d is arranged to temporarily memorize variables necessary for execution of the control program.

The I/O 74e of computer 74 is connected to wheel speed sensors 70-73 through an analogue-to-digital or A/D converter 75 and to hydraulic pressure sensors 77, 78 and 81, 82. As shown in FIG. 1(a) the wheel speed sensors 70-73 are arranged to detect each rotation speed of the road wheels FW1, FW2 and RW1, RW2 for producing analogue voltage signals $V_{FLa}$, $V_{FRa}$, $V_{RLa}$, $V_{RRa}$ respectively indicative of the detected rotation speed of the road wheels. The A/D converter 75 is arranged to convert the analogue voltage signals into digital wheel speed signals $V_{FL}$, $V_{FR}$ and $V_{RL}$, $V_{RR}$. The pressure sensors 77, 78 and 81, 82 are arranged respectively at outlet ports of the pressure control valves 45-48 to detect hydraulic pressure P1-P4 respectively applied to the hydraulic cylinders 41-44 for producing electric signals respectively indicative of the detected hydraulic pressure P1-P4. The I/O 74e of computer 74 is connected to driving circuits 83-86 and to an energizing circuit 87. The driving circuits 83-86 are arranged to memorize control data indicative of optimum hydraulic pressure values P1*-P4* applied thereto from the computer 74 and to apply electric control signals indicative of the optimum hydraulic pressure P1*-P4* to the pressure control valves 45-48. The energizing circuit 87 is arranged to energize or deenergize the changeover valves 51-54 in accordance with data applied thereto from the computer 74.

Figure 5:
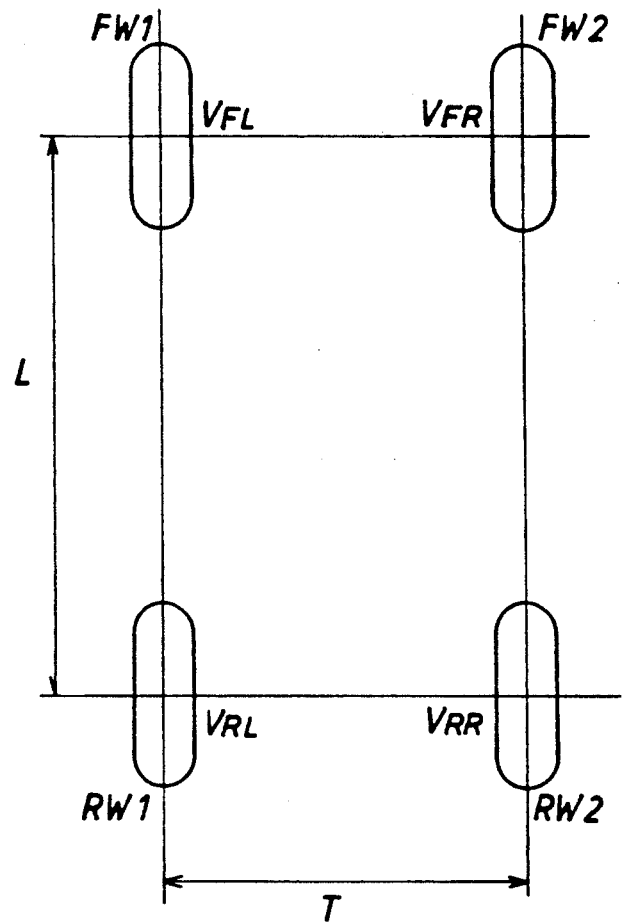
FIG. 5 is a schematic illustration of an arrangement of front and rear road wheels in the vehicle.
Figure 6:
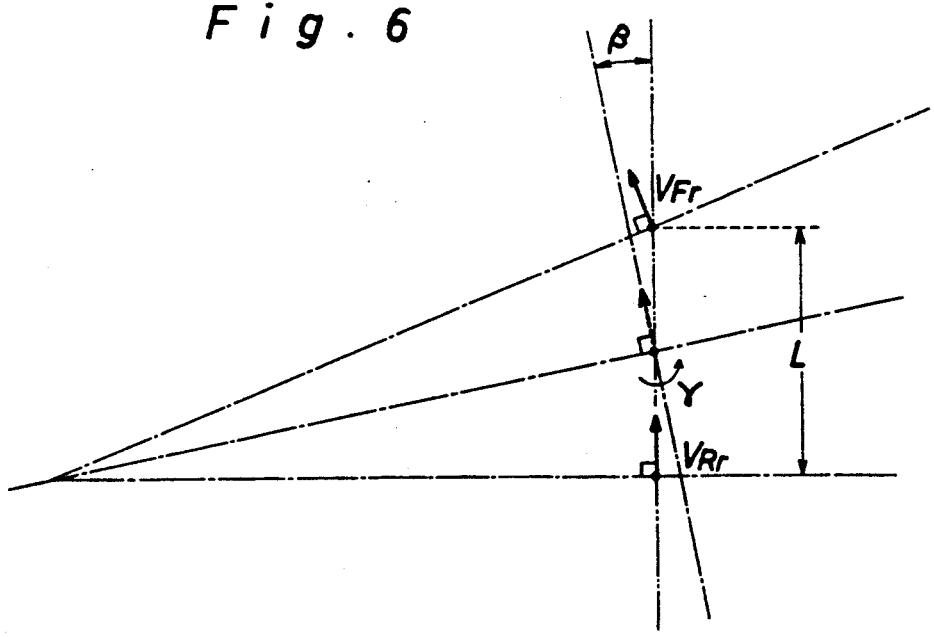
FIG. 6 illustrates a slip angle and a yaw-rate in relation to rotation speeds of the front and rear road wheels.

In this embodiment, a slip angle $\beta$ and a yaw-rate r of the vehicle will be calculated in response to wheel speeds detected by the wheel speed sensors 70-73 in the following manner. In addition, the slip angle $\beta$ means an angle of the travel direction of the vehicle relative to the straight line direction of the vehicle body, and the yaw-rate r means a rotational angle of the vehicle about a vertical axis passing through the gravity of the vehicle. In FIG. 5, the wheel base and tread of the vehicle are indicated by the characters L and T, respectively, and the rotation speeds of the road wheels are indicated by the characters $V_{FL}$, $V_{FR}$ and $V_{RL}$, $V_{RR}$, respectively. Assuming that the rotation speeds of the front and rear road wheels at the right side of the vehicle are represented by $V_{Fr}$ and $V_{Rr}$ as shown in FIG. 6, the slip angle $\beta$ of the vehicle relative to the yaw-rate r of the vehicle is represented by the following equations.

$$\beta \cdot \gamma = V_{Fr} - V_{Rr}/L \qquad (1)$$

$$\beta = V_{Fr} - V_{Rr}/L \cdot 1/r \qquad (2)$$

Figure 7:
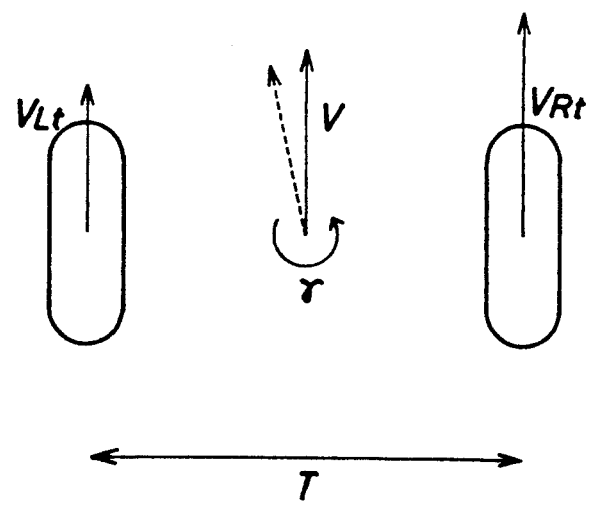
FIG. 7 illustrates a yaw-rate in relation to rotation speeds of the left and right road wheels.

Assuming that the rotation speeds of the left and right road wheels at the front or rear of the vehicle are represented by $V_{Lt}$ and $V_{Rt}$ as shown in FIG. 7, the yaw-rate r of the vehicle is represented by the following equations.

$$T \cdot r = V_{Rt} - V_{Lt} \qquad (3)$$

$$r = V_{Rt} - V_{Lt}/T \qquad (4)$$

where the yaw-rate r becomes positive when the vehicle is turned leftward and becomes negative when the vehicle is turned rightward.

To calculate the slip angle $\beta$, the equation (4) is substituted for the equation (2) as described below.

$$\beta = V_{Fr} - V_{Rr}/L \cdot T/V_{Rt} - V_{Lt} \qquad (5)$$

Thus, each average value of the rotation speeds $V_{Fr}$, $V_{Rr}$ of the front and rear road wheels and each average value of the rotation speeds $V_{Lt}$, $V_{Rt}$ of the left and right road wheels are calculated by the following equations.

$$V_{Fr} = \tfrac{1}{2}(V_{FL} + V_{FR}) \quad (6)$$

$$V_{Rr} = \tfrac{1}{2}(V_{RL} + V_{RR}) \quad (7)$$

$$V_{Lt} = \tfrac{1}{2}(V_{FL} + V_{RL}) \quad (8)$$

$$V_{Rt} = \tfrac{1}{2}(V_{FR} + V_{RR}) \quad (9)$$

As a result, the equation (5) is represented as follows:

$$\beta = T/L \cdot \frac{V_{FL} + V_{FR} - V_{RL} - V_{RR}}{V_{FR} + V_{RR} - V_{FL} - V_{RL}} \quad (10)$$

From the above description, it will be understood that the slip angle $\beta$ can be calculated only by the four rules of arithmetical operations on a basis of the wheel base L, tread T and the rotation speeds $V_{FL}$, $V_{RL}$, $V_{FR}$, $V_{RR}$ of the road wheels.

Figure 4:
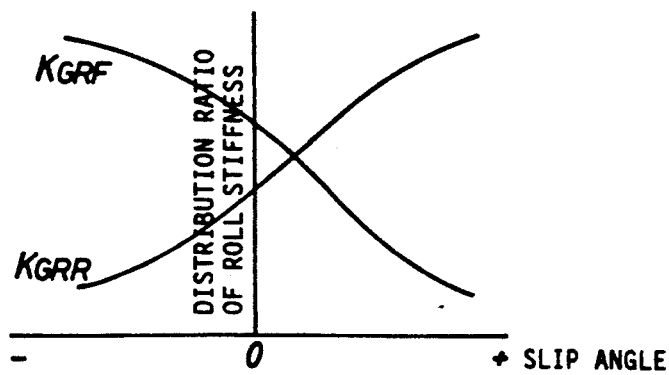
FIG. 4 is a graph showing a distribution ratio of roll stiffness in relation to a slip angle of the vehicle.
Figure 8:
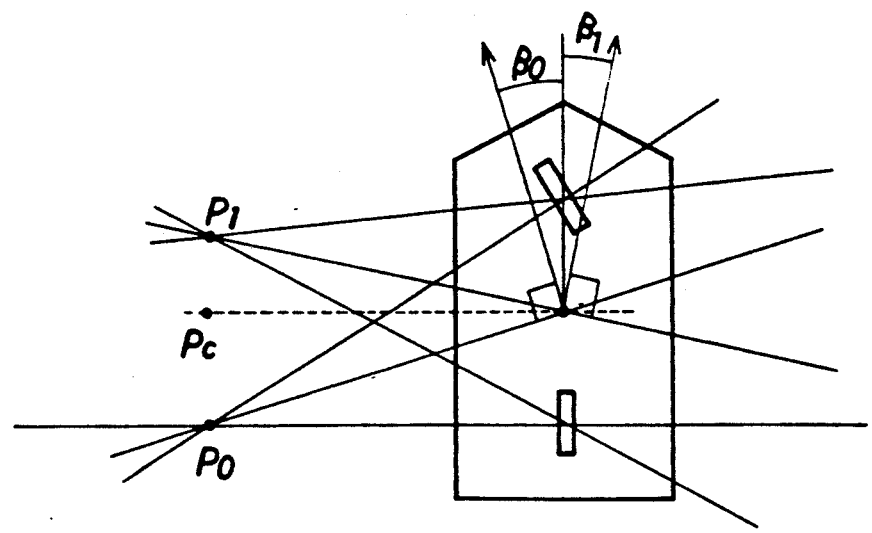
FIG. 8 illustrates a steering characteristic in relation to a slip angle.

With the equation (10), the slip angle $\beta$ becomes positive when the vehicle body is turned leftward and becomes negative when the vehicle body is turned rightward. In the case that the equation (10) is modified as follows:

$$\beta 0 = T/L \cdot \frac{V_{FR} + V_{FL} - V_{RR} - V_{RL}}{V_{FR} + V_{RR} - V_{FL} - V_{RL}} \quad (11)$$

where the slip angle $\beta 0$ represents an angle in an inward direction with respect to the turning direction when it has been made positive and represents an angle in an outward direction with respect to the turning direction when it has been made negative. This means that the vehicle tends to be understeer with respect to a turning center $P_0$ when the slip angle $\beta 0$ is positive and that the vehicle tends to be oversteer with respect to a turning center $P_1$ when the slip angle $\beta 0$ is negative. (see FIG. 8) In addition, the vehicle tends to be oversteer when the distribution ratio of roll stiffness at the rear road wheels is higher than at the front road wheels, and the vehicle tends to be understeer when the distribution ratio of roll stiffness at the front road wheels is higher than that at the rear road wheels. To make the steering characteristic of the vehicle in a neutral tendency, the distribution ratio of roll stiffness is controlled in accordance with the slip angle $\beta 0$ as shown in FIG. 4. That is, the distribution ratio $K_{GRR}$ of roll stiffness at the rear road wheels is increased when the vehicle tends to be understeer in a condition where the slip angle $\beta 0$ is positive, while the distribution ratio $K_{GRF}$ of roll stiffness at the front road wheels is increased when the vehicle tends to be oversteer in a condition where the slip angle $\beta 0$ is negative.

Figure 3:
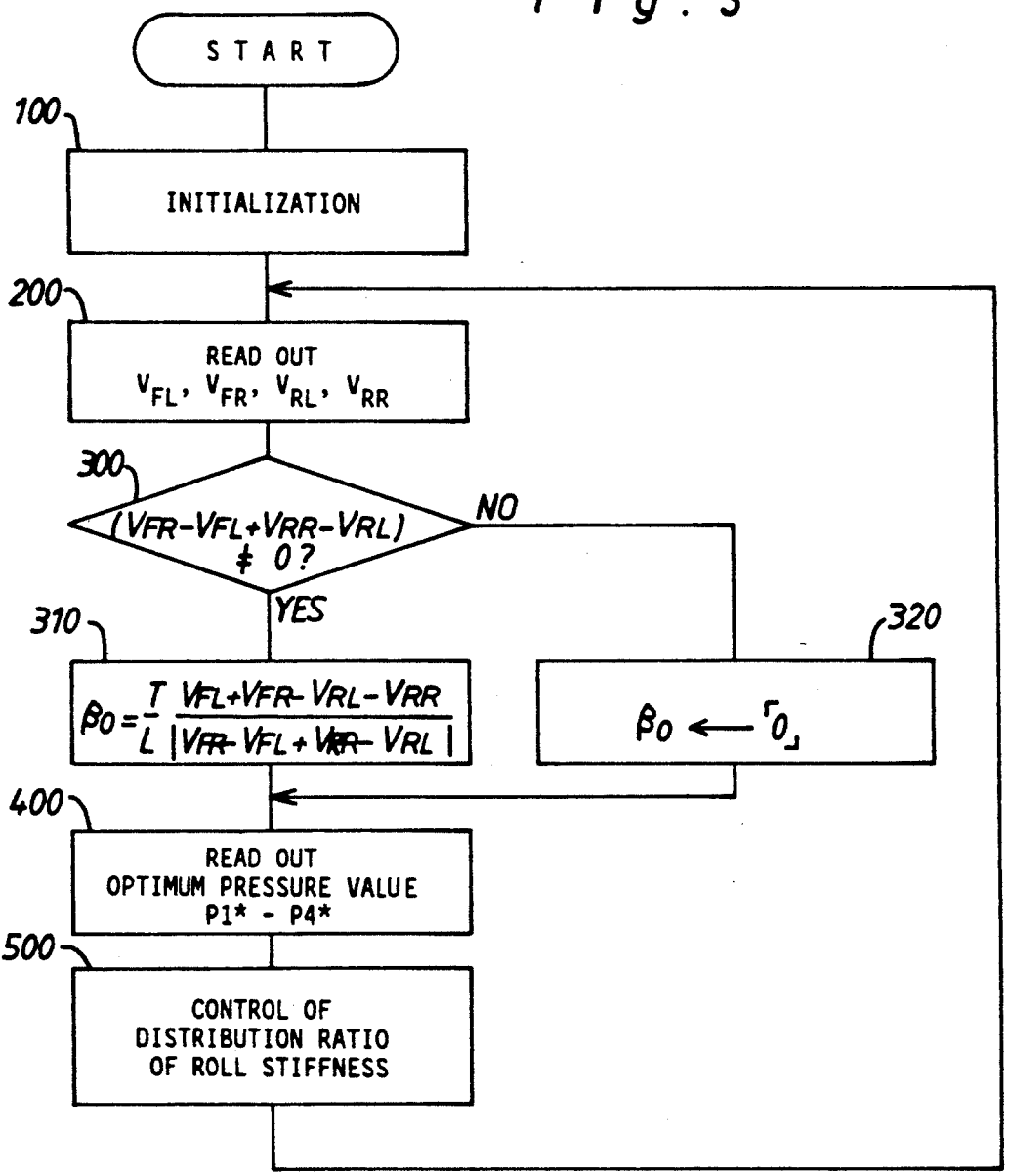
FIG. 3 is a flow chart illustrating a control program to be executed by a microcomputer in the electric control apparatus shown in FIG. 1(b)

Hereinafter, the operation of the electric control apparatus C will be described with reference to the flow chart shown in FIG. 3. Assuming that an ignition switch (not shown) is closed to start the vehicle, the CPU 74c initializes variables for control of the suspension mechanisms at step 100 and applies an output signal for activation of the energizing circuit 87. When activated, the energizing circuit 87 deenergizises the electromagnetic changeover valves 51-54. Thus, the changeover valves 51-54 are closed to interrupt the flow of hydraulic fluid discharged from the hydraulic cylinders 41-44 into the fluid reservoir R therethrough. After such initialization at step 100, the CPU 74c will repeat execution of processing at step 200 to 500 to calculate a slip angle $\beta 0$ on a basis of the equation (11) so that the distribution ratio of roll stiffness at the front and rear road wheels is controlled to an optimum value in accordance with the slip angle $\beta 0$.

In this embodiment, the pressure in hydraulic cylinders 41-44 is increased or decreased to control the distribution ratio of roll stiffness at the road wheels. For this purpose, optimum pressure values P1*-P4* in hydraulic cylinders 41-44 are calculated in such a manner that the distribution ratio of roll stiffness is controlled in accordance with the slip angle $\beta 0$, and the driving circuits 83-86 are applied with electric control signals indicative of the optimum pressure values P1*-P4* to control the pressure control valves 45-48 so that the pressure in hydraulic cylinders 41-44 becomes the optimum pressure values P1*-P4*. The pressure in hydraulic cylinders 41-44 is detected by the pressure sensors 77, 78 and 81, 82. If the detected pressure is larger than the optimum pressure values P1*-P4*, the CPU 74c will cease the processing of the control program.

Assuming that the vehicle travels straight, at step 200 of the program the CPU 74c is applied with digital wheel speed signals indicative of rotation speeds $V_{FL}$, $V_{FR}$, $V_{RL}$, $V_{RR}$ through the A/D converter 75 and I/O 74e to temporarily store them in the RAM 74d. At the following step 300, the CPU 74c determines as to whether the denominator $(V_{FR} - V_{FL} + V_{RR} - V_{RL})$ of the equation (11) is "0" or not. During straight travel of the vehicle, the CPU 74c determines a "NO" answer at step 300 and causes the program to proceed to step 320. Subsequently, the CPU 74c sets a slip angle $\beta 0$ of the vehicle as "0" at step 320 and reads out at step 400 optimum hydraulic pressure values P1*-P4* in relation to the slip angle $\beta 0$ on a basis of the table data shown in FIG. 4. In this instance, the optimum hydraulic pressure values P1*-P4* each are read out as an initial setting value since the slip angle $\beta 0$ is "0". At the following step 500, the CPU 74c applies the optimum hydraulic pressure values P1*-P4* to the driving circuits 83-86. Thus, the driving circuits 83-86 are activated to energize the pressure control valves 45-48 in such a manner that the pressure in hydraulic cylinders 41-44 is regulated to and maintained at the optimum hydraulic pressure values P1*-P4*. As a result, the distribution ratios of roll stiffness at the front and rear road wheels are respectively set as an initial setting value as shown in FIG. 4.

When the steering wheel 62 is turned leftward or rightward, the inward road wheels rotate at a lower speed than the outward road wheels since the turning radius of the inward road wheels becomes smaller than that of the outward road wheels, and the front road wheels rotate at a higher speed than the rear road wheels since the turning radius of the front road wheels becomes larger than that of the rear road wheels. In this instance, the CPU 74c determines a "YES" answer at step 300 and causes the program to proceed to step 310. Thus, the CPU 74c calculates at step 310 an instant slip angle $\beta 0$ of the vehicle as described below. At an initial stage of the turning, the CPU 74c calculates an instant slip angle $\beta 0$ of the vehicle as a positive value on a basis of the equation (11). When the instant slip angle $\beta 0$ is positive, the distribution ratio $K_{GRR}$ of roll stiffness at the rear road wheels becomes larger than the distribution ratio $K_{GRF}$ at the front road wheels as shown in FIG. 4. Accordingly, the optimum hydraulic pressure values P3*, P4* for the hydraulic cylinders 43, 44 are renewed at step 400 to be read out as a larger value than those P1*, P2* for the hydraulic cylinders 41, 42. Thus, the CPU 74c applies electric control signals indicative of the renewed optimum hydraulic pressure values P1*–P4* to the driving circuits 83–86 for control of the pressure control valves 45–48.

When the driving circuits 83–86 are activated in response to the electric control signals from the CPU 74c, the pressure control valves 45, 46 for the front suspension mechanisms A1, A2 are operated to effect a fluid communication between the hydraulic cylinders 41, 42 and the fluid reservoir R so that the pressure in cylinders 41, 42 is decreased to correspond with the renewed optimum hydraulic pressure values P1*, P2*, while the pressure control valves 47, 48 for the rear suspension mechanisms A3, A4 are operated to effect a fluid communication between the hydraulic cylinders 43, 44 and the hydraulic pump P so that the pressure in cylinders 43, 44 is increased to correspond with the renewed optimum hydraulic pressure values P3*, P4*. As a result, the distribution ratios $K_{GRF}$, $K_{GRR}$ of roll stiffness at the front and rear road wheels are controlled in accordance with the positive slip angle $\beta 0$ as shown in FIG. 4. In such a condition where the distribution ratio $K_{GRR}$ of roll stiffness at the rear road wheels is higher than at the front road wheels, the vehicle is controlled to be oversteer, and the slip angle $\beta 0$ will decrease under such a negative feedback control as described above.

When the vehicle tends to be oversteer in the steering operation, the turning radius of the front road wheels becomes smaller than that of the rear road wheels. In this instance, the instant slip angle $\beta 0$ calculated by the CPU 74c at step 310 becomes a negative value. Accordingly, the distribution ratio $K_{GRF}$ at the front road wheels becomes larger than at the rear road wheels as shown in FIG. 4, and in turn, the optimum hydraulic pressure values P1*, P2* for the hydraulic cylinders 41, 42 are renewed to be read out as a larger value than the optimum hydraulic pressure values P3*, P4* for the hydraulic cylinders 43, 44. Thus, the CPU 74c applies electric control signals indicative of the renewed optimum hydraulic pressure values P1*–P4* to the driving circuits 83–86 through the I/O 74e for control of the pressure control valves 45–48. When the driving circuits 83–86 are activated, the pressure control valves 45, 46 for the front suspension mechanisms A1, A2 are operated to effect a fluid communication between the hydraulic cylinders 41, 42 and the hydraulic pump P so that the pressure in cylinders 41, 42 is increased to correspond with the renewed optimum hydraulic pressure values P1*, P2*, while the pressure control values 47, 48 for the rear suspension mechanisms A3, A4 are operated to effect a fluid communication between the hydraulic cylinders 43, 44 and the fluid reservoir R so that the pressure in cylinders 43, 44 is decreased to correspond with the renewed optimum hydraulic pressure values P3*, P4*. Thus, the distribution ratios $K_{GRF}$, $K_{GRR}$ of roll stiffness at the front and rear road wheels are controlled in accordance with the negative slip angle $\beta 0$ as shown in FIG. 4. In such a condition where the distribution ratio $K_{GRF}$ at the front road wheels is higher than at the rear road wheels, the vehicle is controlled to be understeer, and the slip angle $\beta 0$ will increase under such a negative feedback control as described above.

From the above description, it will be understood that the instant slip angle $\beta 0$ can be calculated in accordance with rotation speeds of the road wheels at step 310 of the control program and can be controlled to become "0" under active control of the distribution ratios of roll stiffness at the front and rear road wheels. When the calculated slip angle $\beta 0$ is large, the vehicle tends to be oversteer. In such a condition, the distribution ratio of roll stiffness is increased to render the vehicle understeer. When the calculated slip angle $\beta 0$ is small, the vehicle tends to be understeer. In such a condition, the distribution ratio of roll stiffness is decreased to render the vehicle oversteer. This is useful to effect a desired steering characteristic of the vehicle in a simple manner. Although in the above embodiment the hydraulic cylinders are adapted to control the distribution ratios of roll stiffness at the front and rear road wheels, air spring mechanisms may be substituted for the hydraulic cylinders for the same purpose. It is also obvious to those skilled in the art that the relationship between the slip angle and distribution ratios of roll stiffness shown in FIG. 4 may be appropriately varied to obtain a desired steering characteristic of the vehicle.

Figure 9:
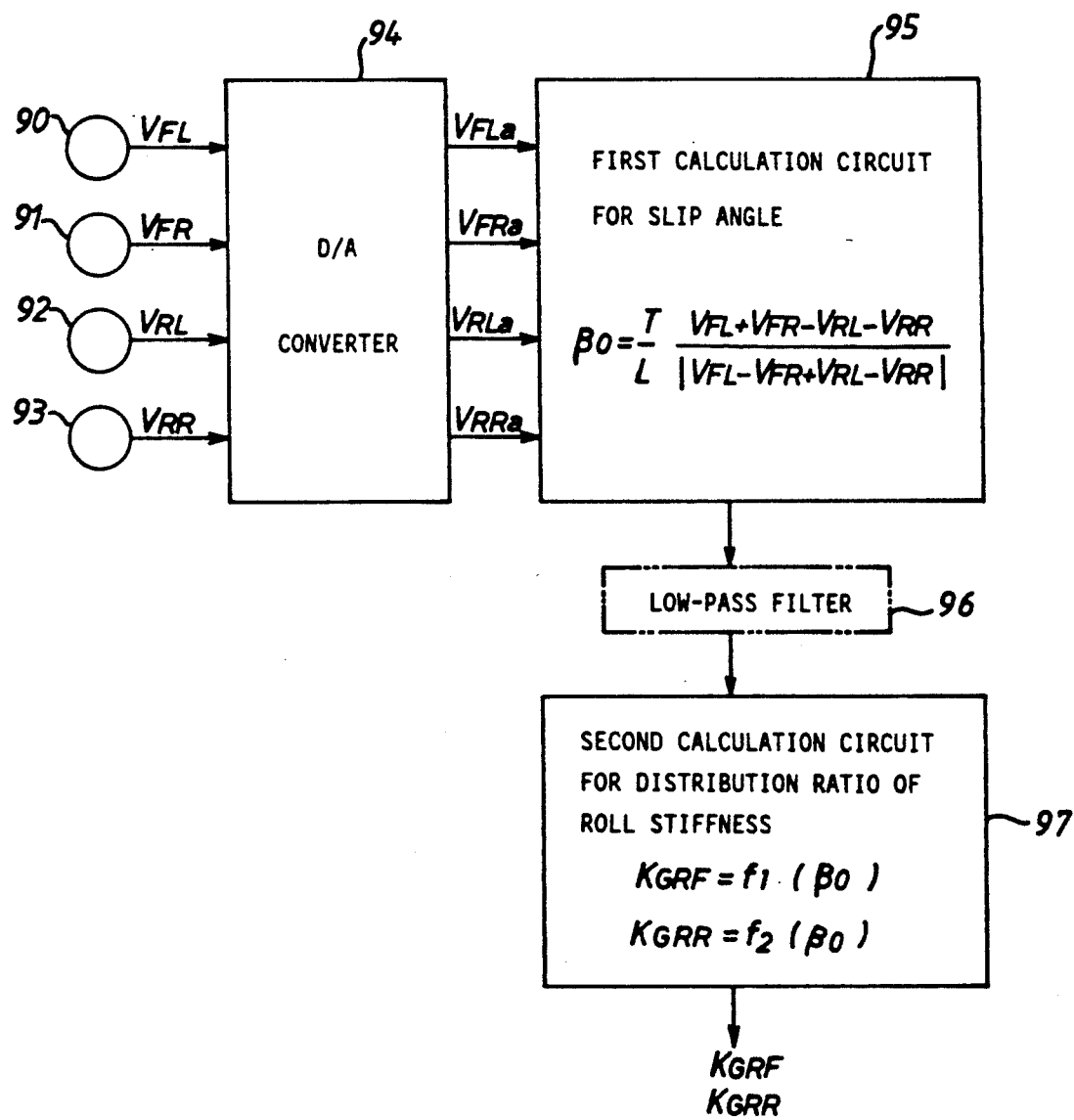
FIG. 9 is a block diagram of a hardware of the electric control apparatus shown in FIG. 1 (b)

In FIG. 9, the foregoing electric control apparatus is schematically illustrated in the form of a hardware, wherein wheel speed sensors 90–93 are arranged to detect rotation speeds of the road wheels FW1, FW2 and RW1, RW2 for producing digital signals $V_{FL}$, $V_{FR}$, $V_{RL}$, $V_{RR}$ respectively indicative of the wheel speeds and a digital-to-analogue or D/A converter 94 is applied with the digital signals $V_{FL}$, $V_{FR}$, $V_{RL}$, $V_{RR}$ to convert them into the corresponding analogue signals $V_{FLa}$, $V_{FRa}$, $V_{RLa}$, $V_{RRa}$. In this hardware, the D/A converter 94 has an internal filter which is arranged to eliminate a high frequency component from the analogue signals. A first calculation circuit 95 is connected to the D/A converter 94 to calculate an instant slip angle $\beta 0$ of the vehicle in response to the analogue signals $V_{FLa}$, $V_{FRa}$, $V_{RLa}$, $V_{RRa}$ applied thereto, on a basis of the equation (11). An electric control signal indicative of the calculated slip angle $\beta 0$ is applied through a low-pass filter 96 to a second calculation circuit 97 which is arranged to calculate the distribution ratios $K_{GRF}$, $K_{GRR}$ of roll stiffness at the front and rear road wheels in relation to the calculated slip angle $\beta 0$. The calculated distribution ratios $K_{GRF}$, $K_{GRR}$ are applied to an appropriate calculation circuit (not shown) which calculates optimum hydraulic pressure values P1a*–P4a* for the hydraulic cylinders 41–44 based on the calculated distribution ratios. Alternatively, the calculated distribution ratios $K_{GRF}$, $K_{GRR}$ may be applied as a gain to an amplifying circuit (not shown) to be multiplied with optimum hydraulic pressure values P1a*–P4a at an initial stage. Analogue signals indicative of the optimum hydraulic pressure values P1a*–P4a* are applied to the driving circuits 83–86 after converted into the corresponding digital signals. In this case, the analogue signals indicative of the optimum hydraulic pressure values may be directly applied to the driving circuits for control of the pressure control valves 45–48.

Figure 10A:
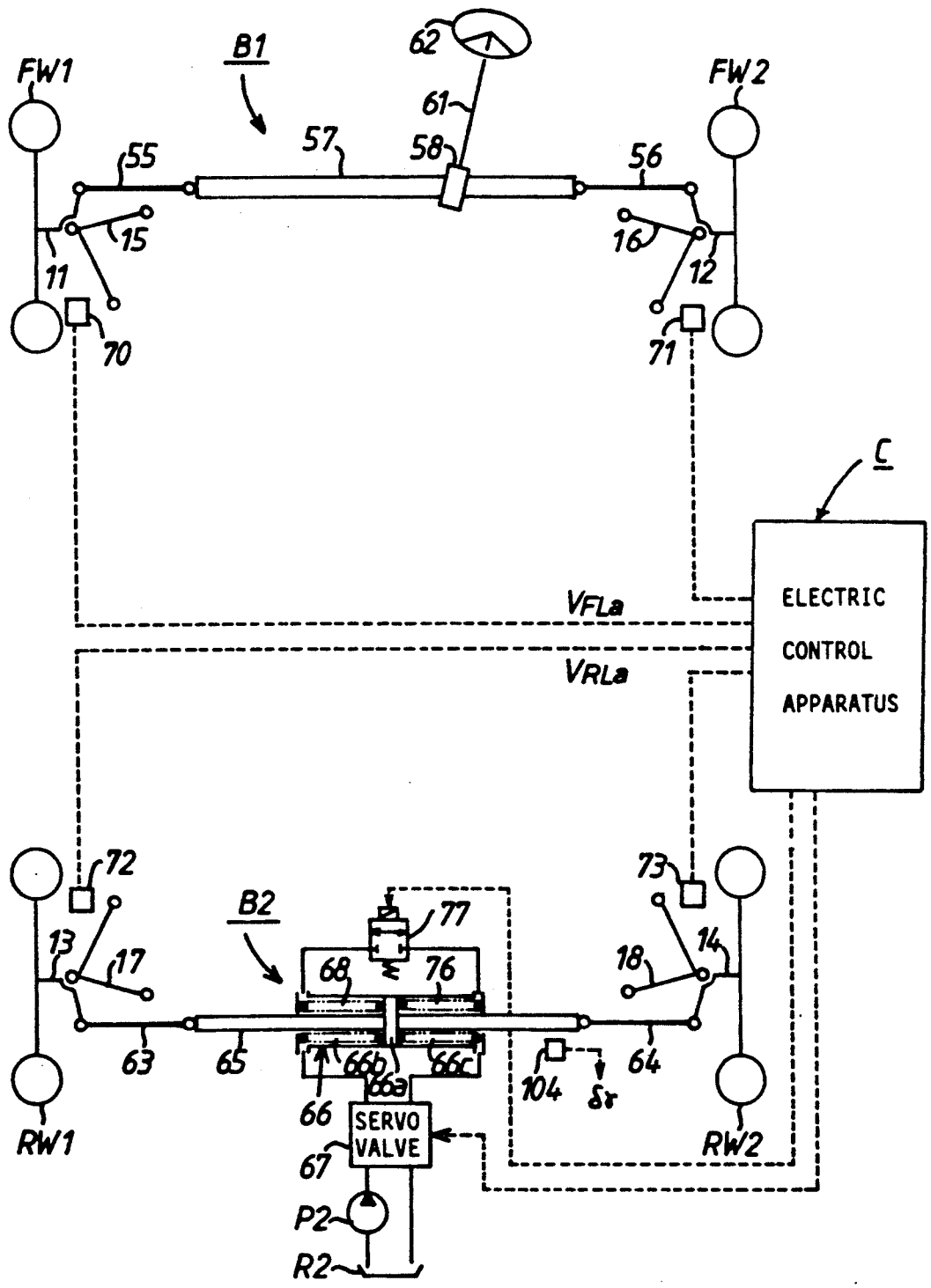
FIGS. 10(a) and 10(b) illustrate an electric control apparatus for a rear-wheel steering mechanism in a wheeled vehicle.
Figure 10:
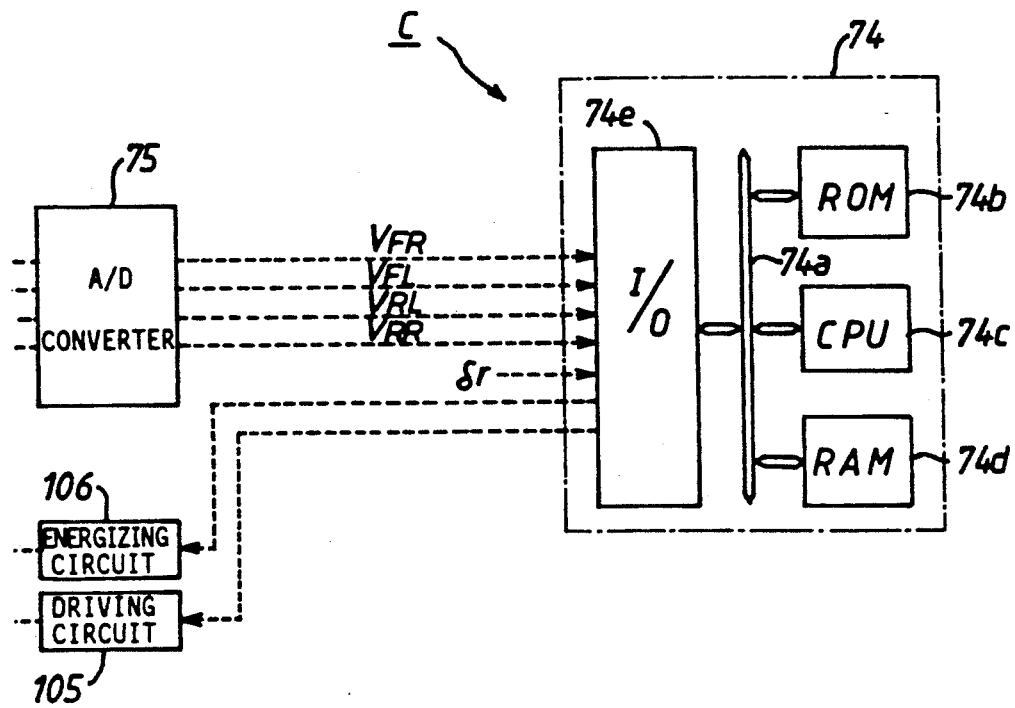

In FIGS. 10(a) and 10(b) there is schematically illustrated a wheeled vehicle equipped with a rear-wheel steering mechanism B2. The front-wheel steering mechanism B1 of the wheeled vehicle is the same as that of the wheeled vehicle shown in FIG. 1(a). The rear-wheel steering mechanism B2 includes a lateral relay rod 65 operatively connected at its opposite ends to rear road wheels RW1, RW2 through tie rods 63, 64 and knuckle arms 13, 14 and a power cylinder 66 mounted on a vehicle body structure (not shown) to effect axial movement of the lateral relay rod 65. The power cylinder 66 has a piston 66a mounted on the relay rod 65 for axial movement therewith and being axially disposed within the power cylinder 65 to form opposite fluid chambers 66b and 66c. The piston 66a is loaded by a pair of axially opposed return springs 68, 76 to be returned to a neutral position. The fluid chambers 66b and 66c are connected to a hydraulic pump P2 and a fluid reservoir R2 through an electrically operated servo valve 67 to be selectively supplied with hydraulic fluid under pressure from pump P2 under control of the servo valve 67. An electromagnetic changeover valve 77 is disposed within a communication passage between the fluid chambers 66b and 66c to provide a fluid communication between fluid chambers 66b, 66c in its deenergized condition and to interrupt the fluid communication between fluid chambers 66b, 66c in its energized condition.

Figure 12:
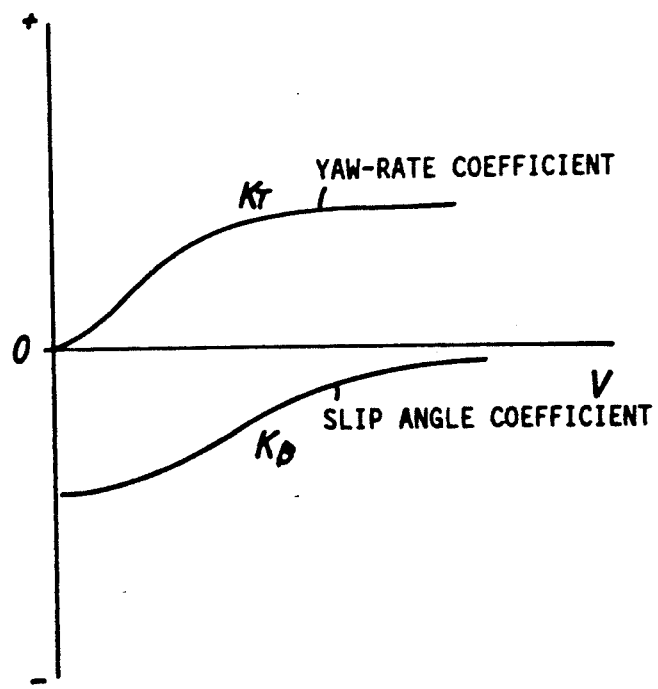
FIG. 12 is a graph showing a yaw-rate coefficient and a slip angle coefficient in relation to an average speed of front and rear road wheels of the vehicle shown in FIG. 10(a)

As shown in FIG. 10(b), an electric control apparatus C for the servo valve 67 and changeover valve 77 has the same microcomputer 74 as that shown in FIG. 1(b). In this embodiment, the ROM 74b is arranged to memorize a control program for the rear-wheel steering mechanism B2 shown by a flow chart in FIG. 11 and to memorize a yaw-rate coefficient $K_r$ and a slip angle coefficient K in relation to a travel speed of the vehicle in the form of first and second tables shown in FIG. 12. The yaw-rate coefficient $K_r$ is a control variable multiplied by a yaw-rate r for steering the rear road wheels RW1, RW2 in the same direction as the front road wheels FW1, FW2 during high speed travel of the vehicle. As shown in FIG. 12, the yaw-rate coefficient $K_r$ increases from "0" in accordance with an increase of the vehicle speed V and becomes a positive constant value when the vehicle speed V exceeds a predetermined high speed. The slip angle coefficient $K\beta$ is a control variable multiplied by a slip angle $\beta$ for steering the rear road wheels RW1, RW2 in the opposite direction to the front road wheels FW1, FW2 during low speed travel of the vehicle. As shown in FIG. 12, the slip angle coefficient $K\beta$ increases from a negative value in accordance with an increase of the vehicle speed and becomes approximately "0" when the vehicle speed exceeds a predetermined high speed.

As shown in FIGS. 10(a) and 10(b), the I/O 74e of computer 74 is connected to a rear wheel steering sensor 104 which is arranged at one side of the relay rod 65 to detect axial movement of the relay rod 65 for producing an electric signal indicative of a steering angle δr of the rear road wheels RW1, RW2. The steering angle δr is represented as a positive value when the vehicle is turned leftward and as a negative value when the vehicle is turned rightward. The I/O 74e is further connected to a driving circuit 105 and an energizing circuit 106. The driving circuit 105 is arranged to memorize control data δr*−δr for the rear road wheels applied thereto from the computer 74 thereby to apply an electric control signal indicative of the memorized control data to the servo valve 67. When applied with the electric control signal, the servo valve 67 is activated to control fluid under pressure supplied to and discharged from the power cylinder 66 for carrying out feedback control of the rear road wheels as follows. Assuming that the control data δr*−δr is positive, the servo valve 67 is activated to connect the left fluid chamber 66b of cylinder 66 to the hydraulic pump P2 and to connect the right fluid chamber 66c of cylinder 66 to the fluid reservoir R2. When the control data δr*−δr is negative, the servo valve 67 is activated to connect the right fluid chamber 66c of cylinder 66 to the hydraulic pump P2 and to connect the left fluid chamber 66b of cylinder 66 to the fluid reservoir R2. In this case, the character δr* represents an optimum steering angle of the rear road wheels. The energizing circuit 106 is arranged to memorize data for energization or deenergization applied thereto from the computer 74 thereby to energize or deenergize the changeover valve 77 in accordance with the memorized data.

Figure 11:
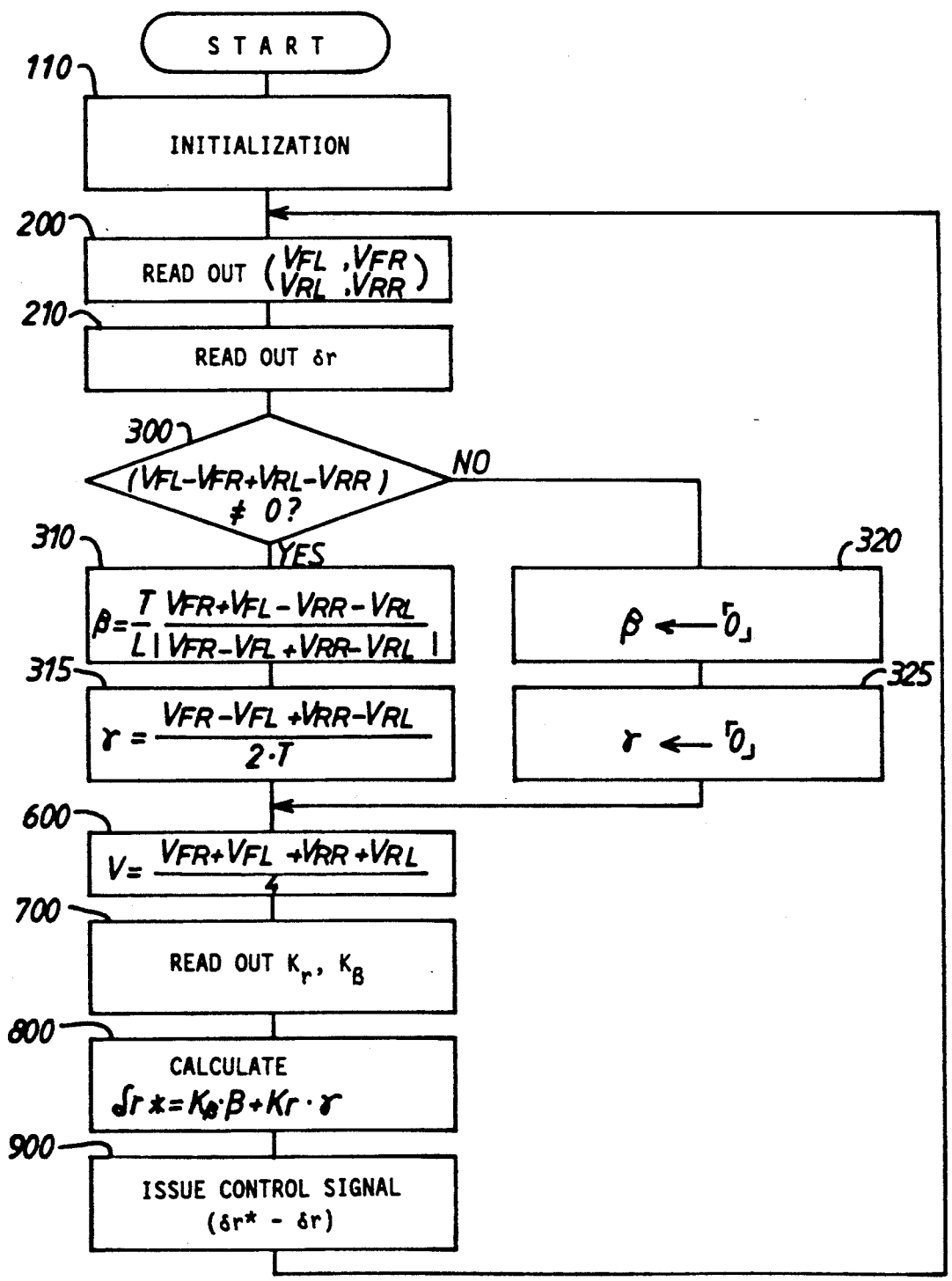
FIG. 11 is a flow chart of a control program to be executed by a microcomputer in the electric control apparatus shown in FIG. 10(b)

Hereinafter, the operation of the electric control apparatus C will be described with reference to the flow chart shown in FIG. 11. Assuming that an ignition switch (not shown) is closed to start the vehicle, the CPU 74c initializes variables for control of the rear wheel steering mechanism B2 at step 110 and produces an output signal for activation of the energizing circuit 106. Under control of the energizing circuit 106, the changeover valve 77 is energized to interrupt the fluid communication between the fluid chambers 66b and 66c of power cylinder 66. After such initialization at step 110, the CPU 74c will repeat execution of processing at step 200 to 900 to calculate a slip angle $\beta$ and a yaw-rate r respectively on a basis of the equations (11) and (4) for control of the rear wheel steering mechanism B2. In this case, the following equation is obtained by the equation (4) and the equations (8) and (9) and is solved to obtain the yaw-rate r.

$$r = V_{FR} - V_{FL} + V_{RR} - V_{RL}/2T \qquad (12)$$

Assuming that the vehicle travels straight, the CPU 74c is applied at step 200 with digital wheel speed signals indicative of rotation speeds $V_{FL}$, $V_{FR}$, $V_{RL}$, $V_{RR}$ through the A/D converter 75 and I/O 74e to temporarily store them in the RAM 74d. At the following step 210, the CPU 74c is applied with a digital signal indicative of an instant steering angle δr of the rear road wheels from the steering angle sensor 104 through I/O 74e to temporarily store it in the RAM 74d. Subsequently, the CPU 74c determines at step 300 as to whether the denominator $(V_{FL} - V_{FR} + V_{RL} - V_{RR})$ is of the equation (10) is "0" or not. During straight travel of the vehicle, the CPU 74c determines a "NO" answer at step 300 and causes the program to proceed to step 320. Thus, the CPU 74c sets the slip angle $\beta$ as "0" at step 320 and sets the yaw-rate r as "0" at the following step 325. When the program proceeds to step 600, the CPU 74c calculates an average value of wheel speeds $V_{FL}$, $V_{FR}$, $V_{RL}$, $V_{RR}$ by the following equation.

$$V = V_{FL} + V_{FR} + V_{RL} + V_{RR}/4 \qquad (13)$$

At the following step 700, the CPU 74c reads out a yaw-rate coefficient $K_r$ and a slip angle coefficient $K\beta$ in relation to the calculated average wheel speed value V from the first and second tables shown in FIG. 12 and calculates at step 800 an optimum rear-wheel steering angle δr* in relation to the calculated slip angle $\beta$, yaw-rate r, yaw-rate coefficient $K_r$ and slip angle coefficient $K\beta$ on a basis of the following equation.

$$\delta r^* = K_r \cdot r + K\beta \cdot \beta \qquad (14)$$

In this instance, the optimum rear-wheel steering angle δr* is calculated as "0" since the yaw-rate r and slip angle δ each have been calculated as "0". After calculation of the optimum rear-wheel steering angle δr*, the CPU 74c produces at step 900 an electric control signal indicative of a difference δr*−δr between the instant steering angle of rear road wheels RW1, RW2 and the optimum rear-wheel steering angle and applies it to the driving circuit 105. In response to the electric control signal, the driving circuit 105 is activated to operate the servo valve 67 for control of the power cylinder 66. If the rear road wheels are turned rightward (or leftward), the instant rear-wheel steering δr becomes negative (or positive), and in turn, the control data δr*−δr becomes a positive value (or a negative value). Thus, the servo valve 67 is operated to supply the hydraulic fluid under pressure from pump P2 into the left (or right) fluid chamber of power cylinder 66 and to discharge the hydraulic fluid from the right (or left) fluid chamber into the reservoir R2. As a result, the power cylinder 66 is operated to displace the relay rod 65 rightward (or leftward) thereby to steer the rear road wheels toward their neutral positions.

When the steering wheel 62 is turned leftward or rightward during low speed travel of the vehicle, the outward road wheels rotate at a higher speed than the inward road wheels, and the front road wheels rotate at a higher speed than the rear road wheels since the turning radius of the front road wheels become larger than that of the rear road wheels when the vehicle tends to be understeer. In this instance, the CPU 74c determines a "YES" answer at step 300 and causes the program to proceed to step 310. Thus, the CPU 74c calculates an instant slip angle $\beta$ based on the equation (10) at step 310 and calculates an instant yaw-rate r based on the equation (12). When the vehicle is turned leftward (or rightward), the instant slip angle $\beta$ is calculated as a positive value (or a negative value), and the instant yaw-rate r is calculated as a positive value (or a negative value). After calculation of the instant slip angle and yaw-rate, the CPU 74c calculates an instant average wheel speed V at step 600 and reads out a yaw-rate coefficient $K_r$ and a slip angle coefficient $K\beta$ in relation to the calculated instant average wheel speed V from the first and second tables shown in FIG. 12.

When the vehicle is travelling at a lowermost speed, the yaw-rate coefficient $K_r$ is calculated as approximately "0", and the slip angle coefficient $K\beta$ is calculated as a large negative value. At step 800, the CPU 74c calculates an optimum rear-wheel steering angle δr* based on the equation (14). When the vehicle is turned leftward (or rightward) at a lower speed, the optimum rear-wheel steering angle δr* is calculated as a negative value (or a positive value). At step 900, the CPU 74c produces an electric control signal indicative of a difference δr*−δr between the optimum rear-wheel steering angle and the instant steering angle of the rear road wheels and applies it to the driving circuit 105. In response to the electric control signal, the driving circuit 105 is activated to operate the servo valve 67 for control of the power cylinder 66, and in turn, the servo valve 67 is operated under activation of the driving circuit 105 to supply the hydraulic fluid under pressure from pump P2 into the right (or left) fluid chamber of power cylinder 66 and to discharge the hydraulic fluid from the left (or right) fluid chamber into the reservoir R2. As a result, the power cylinder 66 is operated to displace the relay rod 65 leftward (or rightward) thereby to steer the rear road wheels rightward (or leftward). In this instance, the rear road wheels are steered in the opposite direction to the front road wheels to enhance maneuverability of the vehicle during low speed travel.

Assuming that the vehicle is turned leftward (or rightward) during high speed travel, a yaw-rate coefficient $K_r$ is read out as a positive large value at step 700 and a slip angle coefficient $K\beta$ is read out as approximately "0" at step 700. In this instance, the yaw-rate r and slip angle $\beta$ become positive (or negative). Thus, an optimum rear-wheel steering angle δr* is calculated as a positive value (or a negative value) based on the equation (14) at step 800. Accordingly, the data δr*−δr for control of the rear road wheels at step 900 becomes positive (or negative). When the driving circuit 105 is activated by an electric control signal indicative of the positive (or negative) data applied thereto from the CPU 74c, the servo valve 67 is operated to supply the hydraulic fluid under pressure from pump P2 into the left (or right) fluid chamber of power cylinder 66 and to discharge the hydraulic fluid from the right (or left) fluid chamber into the reservoir R2. As a result, the power cylinder 66 is operated to displace the relay rod 65 rightward (or leftward) thereby to steer the rear road wheels leftward (or rightward). During such high speed travel of the vehicle, the rear road wheels are steered in the same direction as the front road wheels to ensure stable travel of the vehicle.

In operation of the power cylinder 66 under control of the servo valve 67, the relay rod 65 is delayed in its axial movement. For this reason, it is preferable that the equation (14) is modified as described below.

$$\delta r^* = (K_r \cdot r + K\beta \cdot \beta)/D(s) \tag{15}$$

where the character D(s) is a reciprocal of the delay in axial movement of the relay rod 65. In case the delay is a primary delay, the reciprocal is represented by the following equation.

$$1/D(s) = Ts + 1$$

Figure 13:
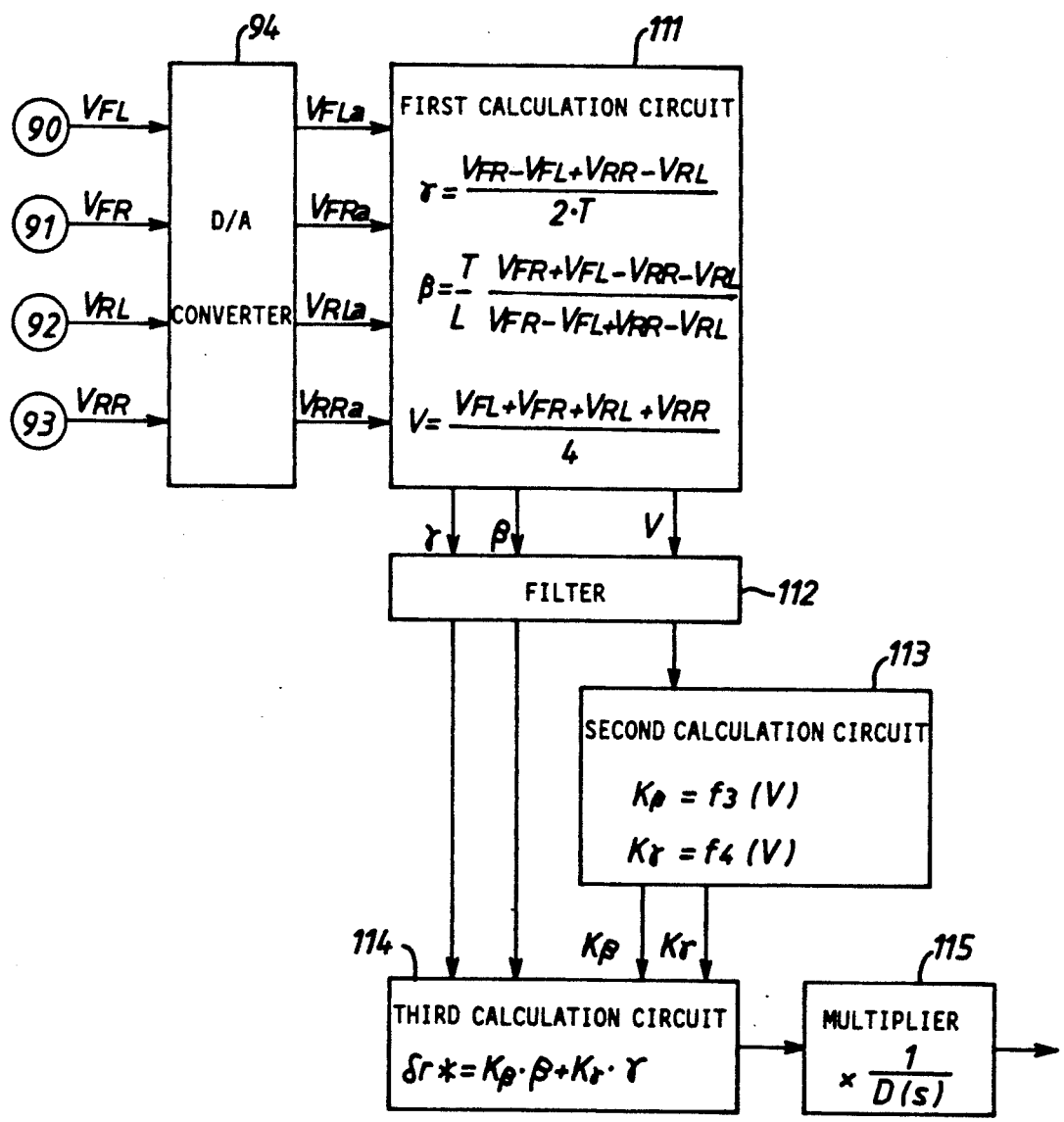
FIG. 13 is a block diagram of a hardware of the electric control apparatus shown in FIG. 10(b)

In FIG. 13 there is schematically illustrated a modification of the hardware shown in FIG. 9, wherein the digital-to-analogue or D/A converter 94 is applied with the digital signals $V_{FL}$, $V_{FR}$, $V_{RL}$, $V_{RR}$ indicative of the wheel speeds to convert them into analogue signals $V_{FLa}$, $V_{FRa}$, $V_{RLa}$, $V_{RRa}$, and wherein a first calculation circuit 111 is applied with the analogue signals $V_{FLa}$, $V_{FRa}$, $V_{RLa}$, $V_{RRa}$ to calculate the instant yawrate r, slip angle $\beta$ and average wheel speed V. The calculated yawrate r, slip angle $\beta$ and average wheel speed V are applied to a filter 112 to be eliminated noise components therefrom. An output signal indicative of the average wheel speed V from filter 112 is applied to a second calculation circuit 113 where the yaw-rate coefficient $K_r$ and slip angle coefficient $K\beta$ are calculated in relation to the average wheel speed V. A third calculation circuit 114 is connected to the filter 112 and the second calculation circuit 113 to calculate an optimum rear-wheel steering angle δr* in response to output signals respectively indicative of the yaw-rate r and slip angle $\beta$ from filter 112 and output signals respectively indicative of the yaw-rate coefficient $K_r$ and slip angle coefficient $K\beta$ from the second calculation circuit 113. A multiplier 115 is connected to the third calculation circuit 114 to multiply the optimum rear-wheel steering angle δr* by a reciprocal of the delay and to apply an electric control signal indicative of the resultant of the multiplication to the driving circuit 105 for control of the power cylinder 66. In this case, the driving circuit 105 is arranged to control the operation of servo valve 67 in accordance with a difference between the instant steering angle of the rear road wheels and the resultant of the multiplication. Although in the above embodiments the computer is arranged to calculate an average wheel speed in response to the wheel speed signals from the wheel speed sensors, a speed sensor mounted on an output shaft of the vehicle transmission may be substituted for the wheel speed sensors.

Figure 14A:
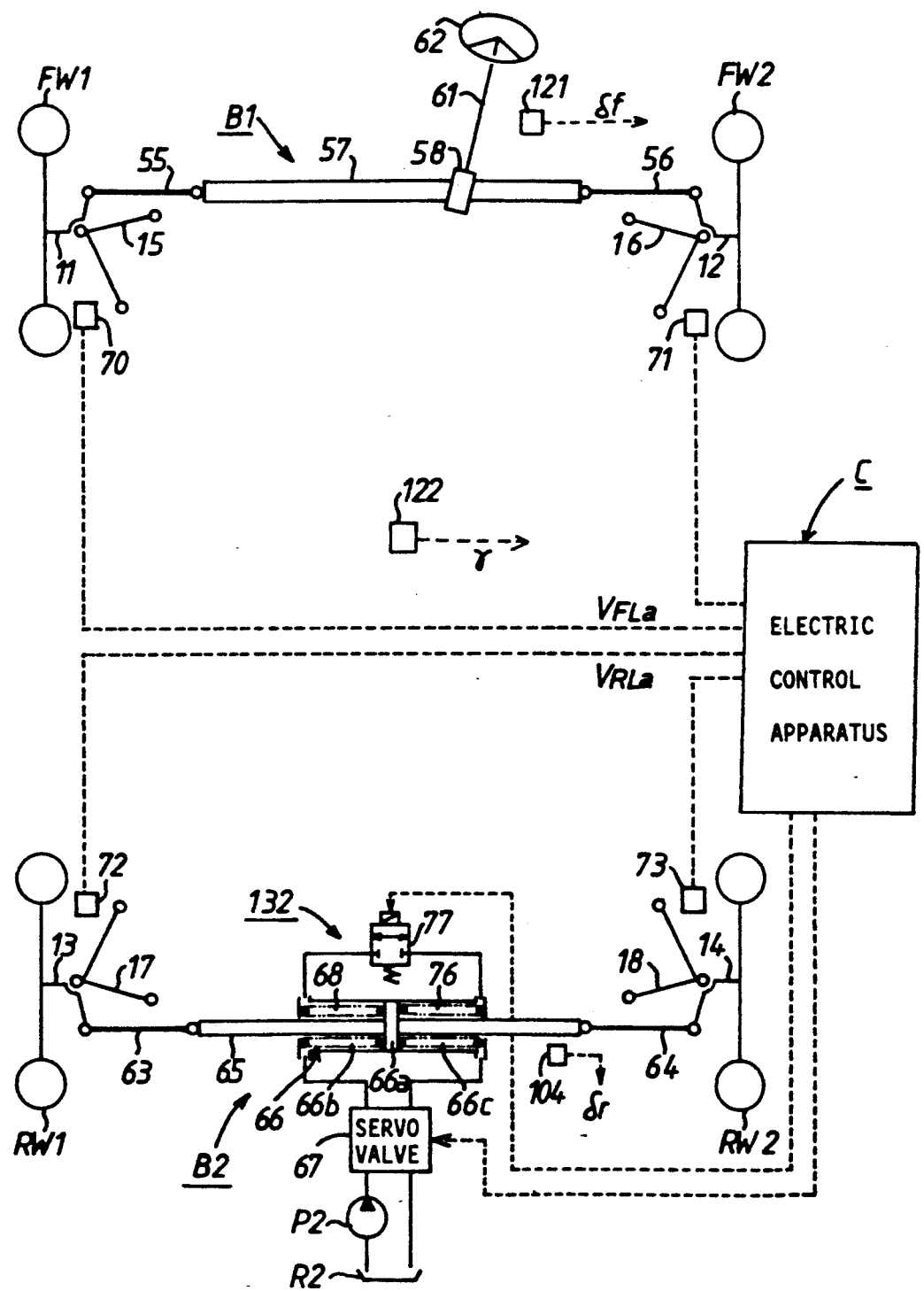
FIGS. 14(a) and 14(b) illustrate another electric control apparatus for the rear-wheel steering mechanism shown in FIG. 14(a)

In FIG. 14 (a) there is illustrated a four-wheel steering system in a wheeled vehicle the component parts of which are substantially the same as those of the wheeled vehicle shown in FIG. 10(a). In the wheeled vehicle shown in FIG. 14(a), a front-wheel steering angle sensor 121 is provided on the steering shaft 61 to detect a rotation angle of the steering shaft 61 for producing an electric signal indicative of a steering angle $\delta f$ of the front road wheels FW1, FW2, and a yaw-rate sensor 122 is mounted on a body structure of the vehicle to detect a rotational angular speed of the vehicle body about a vertical axis for producing an electric signal indicative of a yaw-rate r0 of the vehicle. In this embodiment, the steering angle $\delta f$ of the front road wheels and yaw-rate r0 each are represented by a positive value when the vehicle is turned leftward and represented by a negative value when the vehicle is turned rightward.

Figure 16:
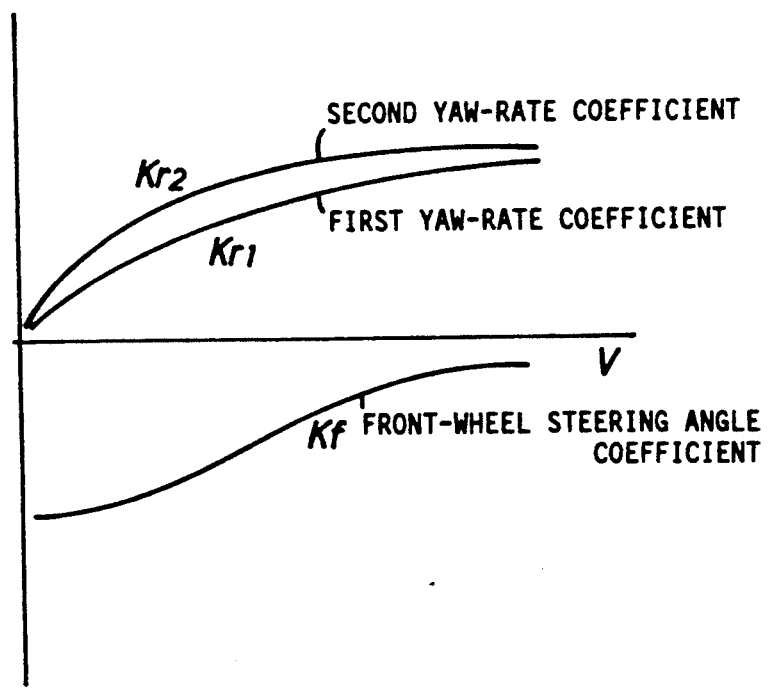
FIG. 16 is a graph showing a front-wheel steering angle coefficient and first and second yaw-rate coefficients in relation to an average speed of front and rear road wheels of the vehicle.
Figure 15:
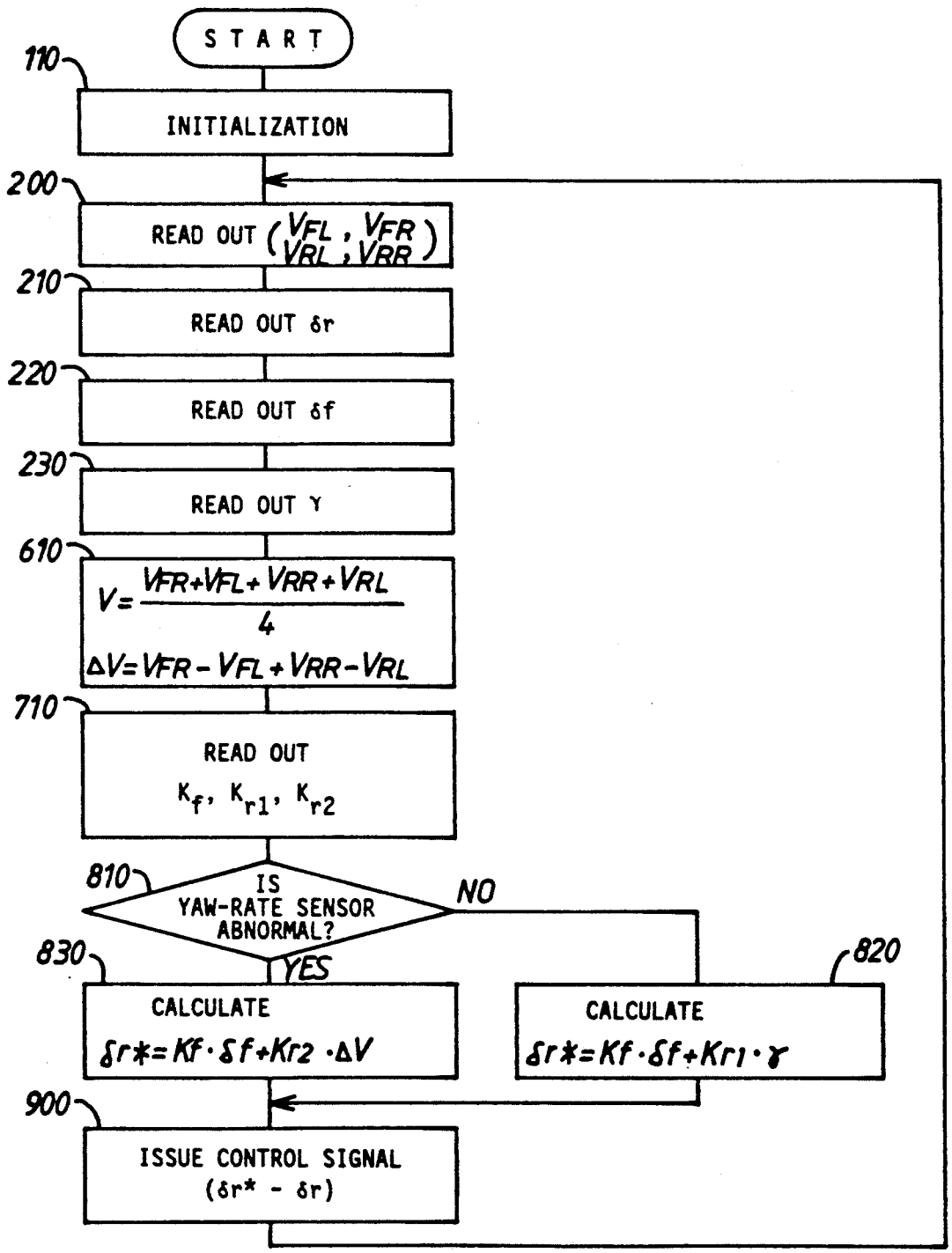
FIG. 15 is a flow chart of a control program to be executed by a microcomputer in the electric control apparatus shown in FIG. 14(b)

In the electric control apparatus for the wheeled vehicle described above, the ROM 74b is arranged to memorize a control program shown by a flow chart in FIG. 15 and to memorize coefficient data shown in FIG. 16. In the ROM 74b, a front-wheel steering angle coefficient Kf is memorized in relation to a travel speed V of the vehicle in the form of a first table, a first yaw-rate coefficient $K_{r1}$ is memorized in relation to the travel speed V of the vehicle in the form of a second table, and a second yaw-rate coefficient $K_{r2}$ is memorized in relation to the travel speed V of the vehicle in the form of a third table. As shown in FIG. 16, the front-wheel steering angle coefficient Kf is defined to be a negative large value when the travel speed V is "0" and to be increase in accordance with an increase of the travel speed V. The first and second yawrate coefficients $K_{r1}$, $K_{r2}$ are defined to be approximately "0" when the travel speed V is "0" and to be increased in accordance with an increase of the travel speed V.

In case the yaw-rate sensor 122 becomes abnormal in operation during travel of the vehicle, the following equation (17) is calculated to estimate a yaw-rate r2 in accordance with a difference $\Delta V$ in speed between the left and right road wheels.

$$r2 = V_{FR} + V_{RR} - V_{FL} - V_{RL}/2 \cdot T \quad (17)$$

Assuming that a difference $\Delta V$ in speed between the left and right road wheels is represented by the following equation (18), the yaw-rate r2 is estimated by calculation of the following equation (19).

$$\Delta V = V_{FR} + V_{RR} - V_{FL} - V_{RL} \quad (18)$$

$$r2 = \Delta V / 2 \cdot T \quad (19)$$

where the difference $\Delta V$ in speed is calculated as an estimated yaw-rate r2 since the tread T is constant.

Hereinafter, the operation of the electric control apparatus shown in FIGS. 14(a) and 14(b) will be described with reference to the flow chart shown in FIG. 15. When an ignition switch (not shown) is closed to start the vehicle, the CPU 74c initializes variables for control of the rear-wheel steering mechanism B2 at step 110 and produces an output signal for activation of the energizing circuit 106. Under control of the energizing circuit 106, the changeover valve 77 is energized to interrupt the fluid communication between the fluid chambers 66b and 66c of power cylinder 66. After such initialization at step 110, the CPU 74c will repeat execution of processing at step 200 to 900 to calculate a front wheel steering angle $\delta f$ and a yaw-rate r or a difference $\Delta V$ in speed between the left and right road wheels for control of the rear-wheel steering mechanism B2 as described below.

Assuming that the yaw-rate sensor 122 is operated in a normal condition, the CPU 74c causes the RAM 74d to temporarily memorize data indicative of instant wheel speeds $V_{FL}$, $V_{FR}$, $V_{RL}$, $V_{RR}$, instant steering angles $\delta r$, $\delta f$ of the rear and front road wheels and an instant yaw-rate r of the vehicle applied thereto from sensors 70–73, 104, 121, 122, respectively at step 200, 210, 220 and 230. When the program proceeds to step 610, the CPU 74c calculates an average wheel speed V of the road wheels and a difference $\Delta V$ in speed between the left and right road wheels on a basis of the equations (13) and (18). At the following step 710, the CPU 74c reads out a front wheel steering angle coefficient Kf and yaw-rate coefficients $K_{r1}$, $K_{r2}$ in relation to the calculated average wheel speed V and causes the program to proceed to step 810. At step 810, the CPU 74c determines as to whether the yaw-rate sensor 122 is abnormal in operation or not. When the answer at step 810 is "NO", the CPU 74c causes the program to proceed to step 820 and calculates an optimum rear-wheel steering angle $\delta r^*$ based on the following equation at step 820.

$$\delta r^* = Kf \cdot \delta f + K_{r1} \cdot r \quad (20)$$

Assuming that the vehicle travels straight, the optimum rear-wheel steering angle $\delta r^*$ is calculated as "0" since the front-wheel steering angle $\delta f$ and yaw-rate r each are detected as "0". When the vehicle is turned leftward (or rightward) during low speed travel, the front-wheel steering angle $\delta f$ and yaw-rate r each are detected as a positive value (or a negative value), the front-wheel steering angle coefficient Kf is defined as a large negative value, and the yaw-rate coefficient Kr1 is defined as approximately "0". For this reason, the optimum rear-wheel steering angle $\delta r^*$ is calculated as a negative value (or a positive value) at step 820. Thus, at step 900 the driving circuit 105 is applied with an electric control signal indicative of a difference $(\delta r^* - \delta r)$ between the instant rear-wheel steering angle and the optimum rear-wheel steering angle, and in turn, the servo valve 67 is operated under activation of the driving circuit 105 to supply the hydraulic fluid under pressure from pump P2 into the right (or left) fluid chamber of power cylinder 66 and to discharge the hydraulic fluid from the left (or right) fluid chamber into the reservoir R2. As a result, the power cylinder 66 is operated to displace the relay rod 65 leftward (or rightward) thereby to steer the rear road wheels in the opposite direction to the front road wheels.

When the vehicle is turned leftward (or rightward) during high speed travel of the vehicle, the front-wheel steering angle $\delta f$ and yaw-rate r each are detected as a positive value (or a negative value), the front-wheel steering angle coefficient Kf is defined as approximately "0", and the yaw-rate coefficient $K_{r1}$ is defined as a large positive value. Thus, an optimum rear-wheel steering angle $\delta r^*$ is calculated as a positive value (or a negative value) at step 820, and a difference $(\delta r^* - \delta r)$ between the instant rear-wheel steering angle and the optimum rear-wheel steering angle becomes positive (or negative). As a result, the servo valve 67 is operated under activation of the driving circuit 105 to supply the hydraulic fluid under pressure from pump P2 into the left (or right) fluid chamber of power cylinder 66 and to discharge the hydraulic fluid from the right (or left) fluid chamber into the reservoir R2. In turn, the power cylinder 66 is operated to displace the relay rod 65 rightward (or leftward) thereby to steer the rear road wheels in the same direction as the front road wheels.

If the yaw-rate sensor 122 becomes abnormal in operation during execution of the program, the CPU 74c determines a "YES" answer at step 810 and causes the program to proceed to step 830. In this instance, an optimum rear-wheel steering angle $\delta r^*$ is calculated on a basis of the following equation at step 830.

$$\delta r^* = Kf \cdot \delta f + K_{r2} \cdot \Delta V \quad (21)$$

In the equation (21), the second yaw-rate coefficient $K_{r2}$ is defined to be similar to the first yaw-rate coefficient Kr1, and the difference $\Delta V$ in speed is estimated as the instance yaw-rate r. Accordingly, the optimum rear-wheel steering angle $\delta r^*$ calculated at step 830 becomes substantially equal to the optimum rear-wheel steering angle calculated at step 820. This means that the steering angle of the rear road wheels can be properly controlled in the same manner as in the normal condition of the yaw-rate sensor 122.

Figure 14B:
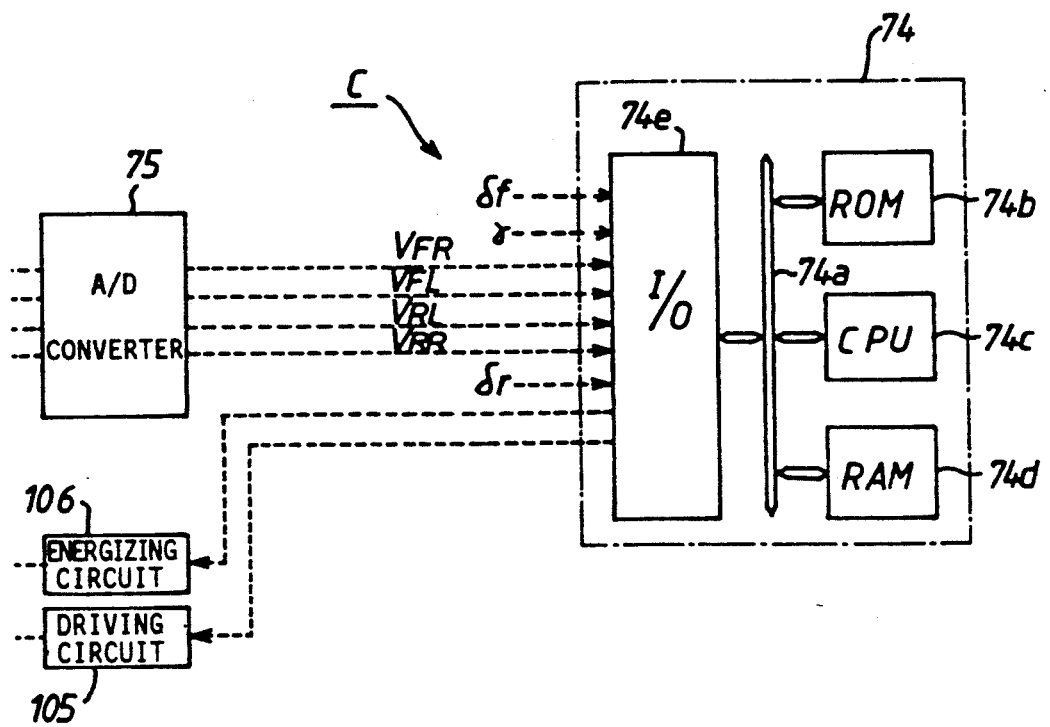
Figure 17:
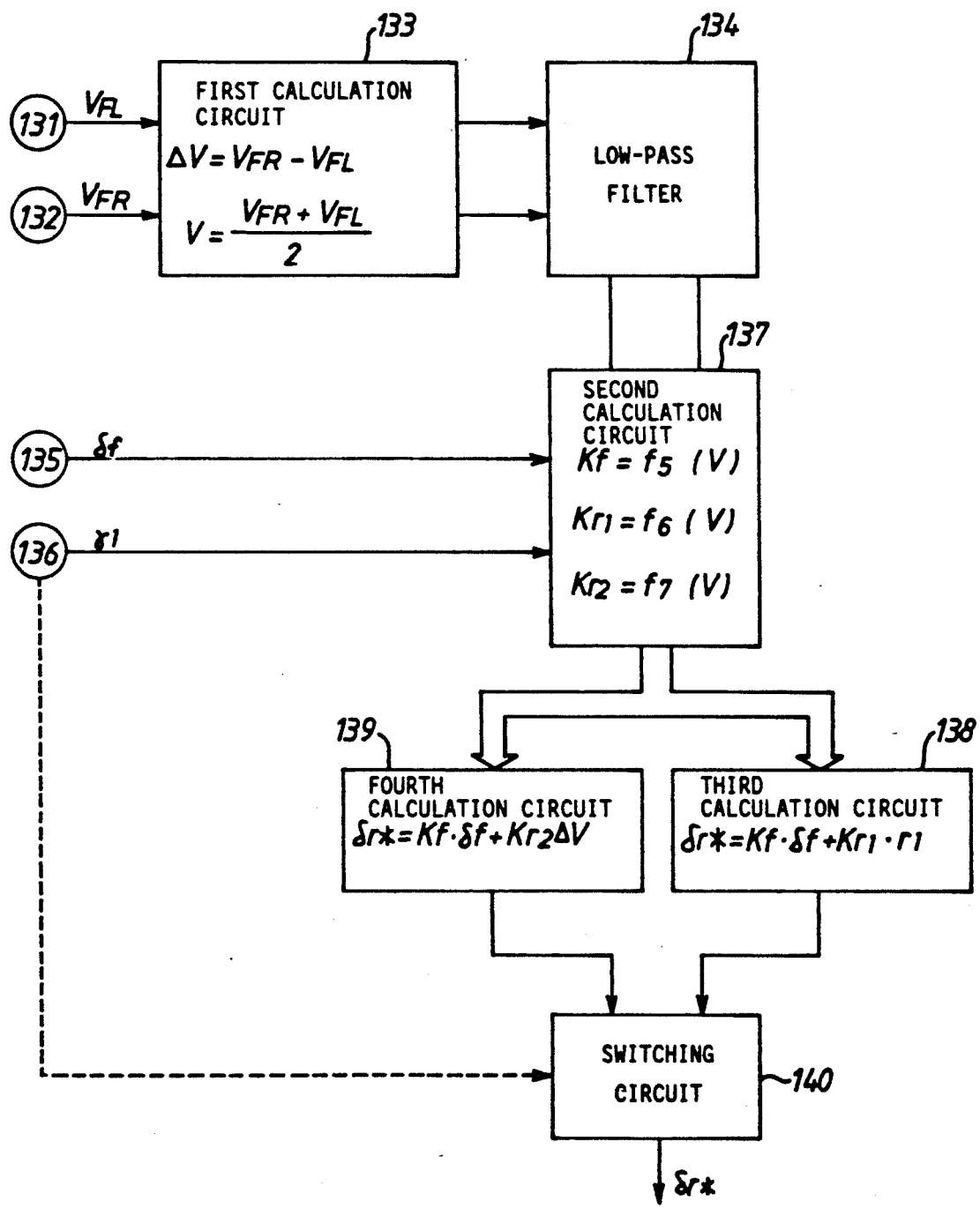
FIG. 17 is a block diagram of a hardware of the electric control apparatus shown in FIG. 14(b).

In FIG. 17 a modification of the electric control apparatus of FIG. 14(b) is schematically illustrated in the form of a hardware, wherein wheel speed sensors 131, 132 are provided to detect each rotation speed $V_{FL}$, $V_{FR}$ of the front road wheels FW1, FW2 for applying analogue signals $V_{FLa}$, $V_{FRa}$ indicative of the wheel speeds $V_{FL}$, $V_{FR}$ to a first calculation circuit 133. The first calculation circuit 133 is responsive to the analogue signals to calculate a difference $\Delta V$ in speed between the front road wheels and an average wheel speed V on a basis of the following equations (22) and (23).

$$\Delta V = V_{FR} - V_{FL} \quad (22)$$

$$V = (V_{FR} + V_{FL})/2 \quad (23)$$

A second calculation circuit 137 is connected to the first calculation circuit 133 through a low-pass filter 134 to be applied with electric signals indicative of the calculated difference $\Delta V$ in speed and average wheel speed V. A front-wheel steering angle sensor 135 is provided to detect a steering angle $\delta f$ of the front road wheels for applying an analogue signal indicative of the front-wheel steering angle $\delta f$ to the second calculation circuit 137, and a yaw-rate sensor 136 is provided to detect an instant yaw-rate r of the vehicle for applying an analogue signal r1 indicative of the instant yaw-rate r to the second calculation circuit 137. The second calculation circuit 137 is arranged to calculate a front-wheel steering angle coefficient Kf and yaw-rate coefficients $K_{r1}$, $K_{r2}$ in relation to the average wheel speed V.

A third calculation circuit 138 is connected to the second calculation circuit 137 to be applied with analogue signals indicative of the calculated coefficients Kf, $K_{r1}$ for calculating an optimum rear-wheel steering angle $\delta r^*$ on a basis of the equation (20). A fourth calculation circuit 139 is connected to the second calculation circuit 137 to be applied with analogue signals indicative of the calculated coefficients Kf, $K_{r2}$ for calculating an optimum rear-wheel steering angle $\delta r^*$ on a basis of the equation (21). A switching circuit 140 is arranged to be applied with the analogue signal r1 indicative of the instant yaw-rate r for determining whether the yaw-rate sensor 136 is operated in a normal condition or not. When the instant yaw-rate r is a normal value, the switching circuit 140 acts to apply an electric control signal indicative of the optimum rear-wheel steering angle $\delta r^*$ from the third calculation circuit 138 to the driving circuit 105 for control of the rear-wheel steering mechanism B2. When the instant yaw-rate becomes excessively small or large, the switching circuit 140 acts to apply an electric control signal indicative of the optimum rear-wheel steering angle $\delta r^*$ from the fourth calculation circuit 139 to the driving circuit 105 for control of the rear-wheel steering mechanism B2.

What is claimed is:

1. An electric control apparatus for controlling a running characteristic of a wheeled vehicle having a set of front road wheels and a set of rear road wheels, comprising:

wheel speed detecting means for detecting each rotation speed of the front and rear road wheels for producing wheel speed signals respectively indicative of the detected rotation speeds of the road wheels, first means, responsive to said wheel speed signals, for detecting a first difference in speed between the front and rear road wheels and a second difference in speed between the left and right road wheels;

second means for calculating a ratio of the first difference in speed relative to the second difference in speed and for estimating a slip angle of the vehicle based on the calculated ratio; and third means for controlling the running characteristic of the vehicle in accordance with the estimated slip angle.

2. An electric control apparatus as claimed in claim 1, wherein said third means comprises an electrically operated suspension mechanism for controlling a distribution ratio of roll stiffness at the front and rear road wheels in accordance with the estimated slip angle of the vehicle.

3. An electric control apparatus as claimed in claim 1, wherein said first means includes means for calculating a first difference in speed between the front and rear road wheels at one side of the vehicle and a second difference in speed between the left and right road wheels at one of the front or rear of the vehicle.

4. An electric control apparatus as claimed in claim 1, further comprising means for calculating a yaw-rate of the vehicle based on the calculated second difference in speed between the left and right road wheels and means for calculating an average value of said each detected rotation speed of the road wheels, for estimating a travel speed of the vehicle based on the calculated average value, and wherein said third means comprises an electrically operated rear-wheel steering mechanism for controlling a steering angle of the rear road wheels in accordance with the estimated travel speed, the estimated slip angle and the calculated yaw-rate of the vehicle.

* * * * *